(12) United States Patent
Ober

(10) Patent No.: US 7,733,221 B2
(45) Date of Patent: Jun. 8, 2010

(54) APPARATUS AND METHOD FOR WIRELESS NETWORK PARAMETER LOGGING AND REPORTING WITHIN A PORTABLE DEVICE HAVING WIRELESS COMMUNICATION FUNCTIONALITY

(75) Inventor: Robert Ober, San Jose, CA (US)

(73) Assignee: GlobalFoundries Inc., Grand Cayman (KY)

( * ) Notice: Subject to any disclaimer, the term of this patent is extended or adjusted under 35 U.S.C. 154(b) by 922 days.

(21) Appl. No.: 11/478,695

(22) Filed: Jun. 30, 2006

(65) Prior Publication Data

US 2008/0001732 A1    Jan. 3, 2008

(51) Int. Cl.
*G08B 1/08*    (2006.01)
(52) U.S. Cl. ............... 340/539.17; 340/506; 340/539.1; 340/539.11; 340/539.21
(58) Field of Classification Search ............. 340/506, 340/517, 521, 539.1, 539.11, 539.21
See application file for complete search history.

(56) References Cited

U.S. PATENT DOCUMENTS

| | | | |
|---|---|---|---|
| 5,903,548 A | * | 5/1999 | Delamater ............. 370/310 |
| 6,225,901 B1 | * | 5/2001 | Kail, IV ............. 340/539.11 |
| 6,925,286 B1 | | 8/2005 | Kraiem |

* cited by examiner

*Primary Examiner*—Daryl Pope
(74) *Attorney, Agent, or Firm*—Meyertons, Hood, Kivlin, Kowert & Goetzel, P.C.; Stephen J. Curran

(57) ABSTRACT

An apparatus for logging and reporting network parameters within a portable communication device that includes a processor and a wireless module that may communicate with a wireless network such as a wireless telephone network, for example, via a wireless connection. The wireless module may determine characteristic information associated with the wireless connection and may provide the characteristic information to the processor. The processor may format the characteristic information for transmission and then transmit the formatted characteristic information to the wireless network. In addition, the processor may store the characteristic information within the portable communication device for future aggregation and transmission.

25 Claims, 4 Drawing Sheets

APPARATUS AND METHOD FOR WIRELESS NETWORK PARAMETER LOGGING AND REPORTING WITHIN A PORTABLE DEVICE HAVING WIRELESS COMMUNICATION FUNCTIONALITY

BACKGROUND OF THE INVENTION

1. Field of the Invention

This invention relates to portable communication devices and, more particularly, to portable communication devices that include wireless communication functionality that may provide logging and reporting of wireless network parameters.

2. Description of the Related Art

The proliferation of wireless communication devices has been nothing short of amazing. Communication companies are constantly striving to increase the coverage area of their wireless telephone networks, and manufacturers are constantly increasing the functionality of communication devices such as mobile telephones, for example, to include such features as web browsing. Accordingly, more and more people are using personal communication devices to transfer larger and larger volumes of data via connections to wireless telephone networks, wireless wide area networks (WAN), and the like.

However, along with this growth in the popularity of wireless services, comes the problem of efficiently upgrading the wireless network infrastructure to accommodate that growth. Although quality of service is becoming increasingly important to the users, network upgrades can be costly. As such, it may be desirable to prioritize upgrades based where the need is greatest. Network engineers may constantly monitor the network trying to determine network characteristics such as network traffic patterns, congestion, coverage area deficits, and so on. However, gathering the network characteristic information to make accurate determinations may not be an easy task.

SUMMARY

Various embodiments of an apparatus for logging and reporting network parameters within a portable communication device having wireless communication functionality are disclosed. In one embodiment, the portable communication device includes a processor and a wireless module that may communicate with a wireless wide area network such as a wireless telephone network, for example, via a wireless connection. The wireless module may determine characteristic information associated with the wireless connection and may provide the characteristic information to the processor. The processor may format the characteristic information for transmission via the wireless connection. The wireless module may transmit the formatted characteristic information to the wireless network.

In one specific implementation, the processor may store the characteristic information within a storage of the portable communication device prior to formatting and transmission of the formatted characteristic information.

In various specific implementations, the characteristic information may include connection speed information associated with a rate of transfer of data via the wireless connection. The characteristic information may also include information corresponding to a bit error rate of the wireless connection. Further, characteristic information may include information corresponding to a geographic location of the communication device during determination of the characteristic information.

Figure 1:
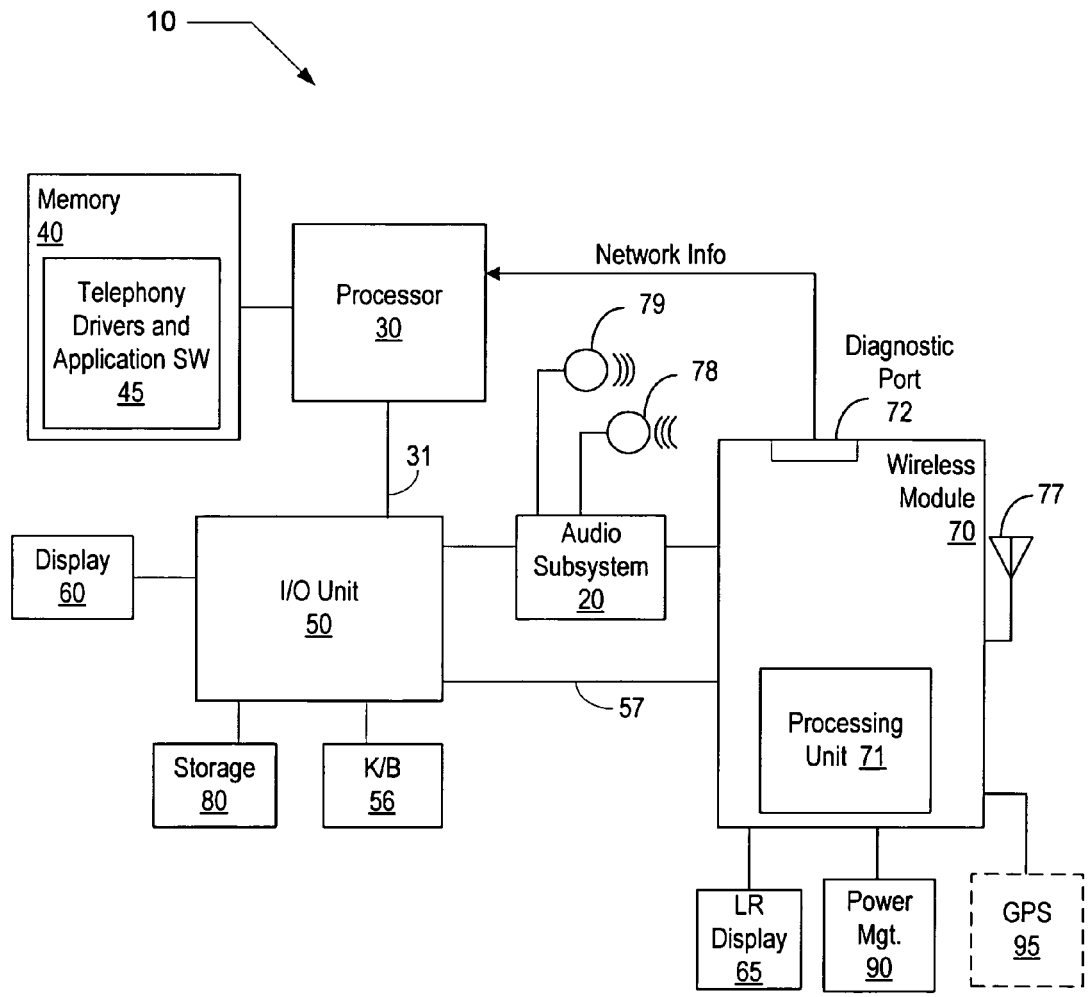
FIG. 1 is a block diagram of one embodiment of a portable communication device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a portable communication device including wireless functionality is shown. Portable communication device 10 includes a processor 30 coupled to a memory 40 and to an input/output (I/O) unit 50. I/O hub 50 is coupled to various I/O devices such as a display 60, a storage device 80, a keyboard 56, and a wireless module 70. Wireless module 70 is coupled to a low-resolution display 65, and a power management unit 90. In addition, an audio subsystem 20 is coupled between I/O unit 50 and wireless module 70. In one implementation, portable communication device 10 may be a laptop, notebook, or other portable computer system.

It is noted that communication device 10 may include various other components and circuits that have been omitted for simplicity. It is further noted that the components of the computing subsystem are depicted in FIG. 1 for illustrative purposes. It is contemplated that the functionality associated with the various components may be distributed differently such that the lines between blocks may be drawn differently. Moreover, it is entirely possible that the functionality shown in FIG. 1 may be implemented on a single integrated circuit chip, such a system on a chip (SOC) implementation, as desired.

In the illustrated embodiment, processor 30 may be illustrative of a microprocessor that implements the x86 architecture. Although in other embodiments, processor 30 may be any type of processor implemented with any type of architecture. In one embodiment, processor 30 may include a memory controller (not shown) to facilitate memory transactions directed to memory 40, for example. In addition, processor 30 may include various interface circuits such as a host interface (not shown) for controlling transactions with I/O unit 50.

I/O unit 50 may be any of a variety of I/O controllers that may include bridging and graphics circuits (not shown) that may be used as interfaces between processor 30 and the various I/O devices and buses to which it is coupled. For example, in one embodiment, I/O unit 50 may be coupled to processor 30 via a HyperTransport™ link 31. In such an embodiment, I/O unit 50 may include one or more Hyper-Transport™ to peripheral component interconnect (PCI) and/or a HyperTransport™ to universal serial bus (USB) bridges for connection to PCI and USB devices, respectively, for example. In addition, in one embodiment, I/O unit 50 may be coupled to wireless module 70 via a USB, HyperTransport™ or other type of link 57, although other interconnects are contemplated. Further, I/O unit 50 may include and graphics functionality for generation of the various signals used in association with display 60 and LR display 65, for example.

It is noted that although I/O unit 50 is coupled to processor 30 via a link such as a HyperTransport™ link, for example, it is contemplated that in other embodiments, processor 30 may be coupled to the components of the system using a more traditional system architecture. For example, processor 30 may be coupled to a bus bridge (not shown) such as a Northbridge via shared bus arrangement (e.g., front side bus (FSB)). In addition, a separate bus bridge such as a Southbridge (not shown) may be coupled to the Northbridge for coupling to various other peripheral devices (e.g., storage 80, KB 56, etc.). In such embodiments, wireless module 70 may be coupled to the Northbridge via any type of link such as a USB link, for example.

The audio subsystem 20 may include audio functionality including analog-to-digital and digital to-analog circuits for generation of the various signals associated with microphone 79 and speaker 78, for example.

Storage 80 may be a mass storage device. For example, in one embodiment storage 80 may include one or more hard disk drives. In other embodiments, storage 80 may include other types of storage media such as a non-volatile random access memory (RAM) device (e.g., a memory stick, or flash drive), compact disk (CD) drive, digital video disk (DVD) drive, tape drive, floppy drive, and the like.

In one embodiment, display 60 may be a liquid crystal display (LCD) or other type of displays such as may be common to portable laptop and notebook computers. In contrast, LR display 65 may be a display such as the type of display used on a mobile telephone or a personal digital assistant (PDA) for example. In one embodiment, LR display 65 may have a lower resolution than display 60. As will be described in greater detail below, in some modes of operation of portable communication device 10, LR display 65 may be used exclusively, while in other modes, display 60 may be used exclusively, and in still other modes, both displays may used concurrently.

As shown, wireless module 70 is coupled to an antenna 77. Wireless module 70 includes a processing unit 71. Wireless module 70 may include the functionality of a wireless communication device such as a mobile telephone, for example. As such, in one embodiment, processing unit 71 may execute instructions and perform functions, and may include analog, digital, radio frequency (RF) and baseband circuits (not shown) that may function to perform such tasks as RF signal reception and transmission, up-conversion and down-conversion of the RF signals, analog-to-digital conversion, digital-to-analog conversion, digital signal processing of the baseband signals, as well as monitoring and control functions. Accordingly, in various implementations, processing unit 71 may include hardware that includes a separate processor such as an advanced RISC machine (ARM) processor, for example, a digital signal processing unit, and/or one or more hardware accelerators for handling complex algorithms such as encryption and decryption.

In one embodiment, the instructions executed by processing unit 71 may include instructions that implement network parameter measurement applications. As such, wireless module 70 may be configured to determine network characteristics such as wireless connection speed, for example. As described in greater detail below, wireless module 70 may also be configured to provide the information that corresponds to the network characteristics to processor 30 for formatting in preparation for transmitting the information to the wireless network.

As mentioned above, wireless module 70 may communicate with a wireless network such as a wireless wide area network that may include a wireless telephone network, for example. The wireless network may conform to any of a variety of communication standards that may be compatible with various technologies such as the second (2G), third (3G) and fourth (4G) generation mobile phone technologies. In addition, the wireless network may be a wireless wide area network implemented to be compatible with such protocols as WiMax, WiBro, NextNet, and others. More particularly, in various embodiments, wireless module 70 may employ a time-division multiple access (TDMA), a code division multiple access (CDMA) and/or a wireless CDMA (WCDMA) technique to implement standards such as the Global System for Mobile Communications (GSM) standard, the Personal Communications Service (PCS) standard, and the Digital Cellular System (DCS) standard, for example. In addition, many data transfer standards that work cooperatively with the various technology platforms may also be supported. For example, wireless module 70 may also implement the General Packet Radio Service (GPRS) standard, the Enhanced Data for GSM Evolution (EDGE) standard, which may include Enhanced General Packet Radio Service standard (E-GPRS) and Enhanced Circuit Switched Data (ESCD), and the high speed circuit switched data (HSCSD) standard, high speed downlink packet access (HSDPA), high speed uplink packet access (HSUPA), evolution data optimized (EV-DO), among others.

In one embodiment, memory 40 may be a system memory that is used to store instructions and data that may be used by processor 30 as well as other devices (e.g., I/O unit 50). In various embodiments, memory 40 may be implemented using any of a variety of volatile or non-volatile memory devices. For example, memory 40 may be implemented using any number of memory devices in the dynamic RAM family of devices. In one embodiment, memory 40 may be implemented using removable or non-removable memory modules with the memory devices affixed thereto. However, other memory device configurations are possible and contemplated.

As shown, memory 40 includes telephony drivers and application software 45 stored therein. It is noted that telephony drivers and application software 45 may be stored more permanently within storage 80 and during run time, at least portions of the instructions and data being executed by processor 30 may be loaded into memory 40.

Portable communication device 10 may be described in terms of including a computing subsystem and a wireless subsystem. In one embodiment, the computing subsystem may include the components that typically make up a computing platform. For example, the computing subsystem may include processor 30, memory 40, I/0 unit 50, display 60 and so on. The wireless subsystem may include wireless module 70, which includes processing unit 71, memory 72, and LR display 65. As will be described in greater detail below, in one embodiment, portable communication device 10 may operate in various modes.

During operation of portable communication device 10, either subsystem may be used alone, or both subsystems may be used together in various combinations. For example, in one mode, portable communication device 10 may operate such that only the wireless module 70 may be in operation while the computing subsystem components may be in a standby or low power state. As such, portable communication device 10 may be operated as a wireless communication device such as a mobile telephone or a personal digital assistant (PDA). In such an embodiment, LR display 65 may be used. In another mode, the wireless subsystem may be turned off or placed in a standby mode and portable communication device 10 may operate simply as a laptop or notebook computer. In still other modes, portable communication device 10 may operate using various combinations of computing and wireless communication functionality. It is noted that while portable communication device 10 is operated in the different modes, one or more components may be powered down or placed in a standby mode or other low power states. As such, portable communication device 10 includes a power management unit 90 that may manage the different modes and power states and any switching therebetween.

Depending upon the application software and drivers that may be installed, portable communication device 10 may function as a laptop computer with a fully integrated wireless communication platform that includes voice and data transfer functionality. In addition, due to the integration of the wireless hardware and the telephony drivers and application software 45 on the portable computing platform, the management of various email, address books, and other files may be seamless to a user. For example, the telephony drivers and application software 45 may include instructions that may be used to configure the wireless module 70. In one implementation, a user may select a driver via the operating system or other mechanism, for example. The driver may configure one or more operational characteristics and/or behaviors of wireless module 70. In addition, the telephony drivers and application software 45 may be used to manage email, address books, phone lists, databases, calendars, and other information traditionally used on a mobile telephone. The application software 45 may include applications which may access routing tables and/or routing table databases in response to being provided with network characteristic information. The application software may also include applications that may be run by processor 30 such as spreadsheet, word processing, games, and the like. Once the user configures the system operation, such operations as managing general IP data traffic, receiving incoming calls, sending outgoing calls, receiving and sending email, and display management may be fully automated from a platform user perspective.

Figure 2:
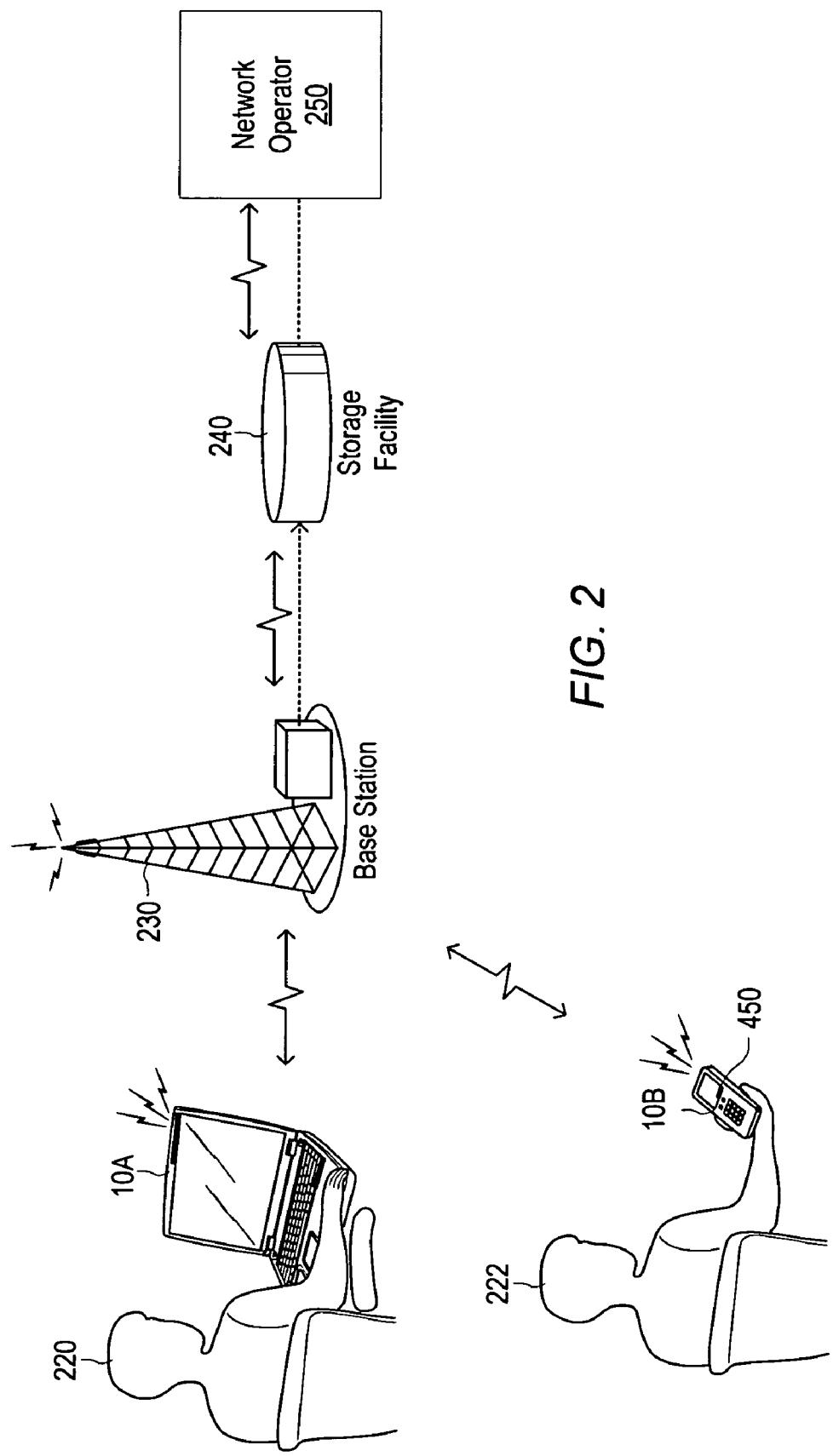
FIG. 2 is a diagram depicting embodiments of the portable communication device being used in a wireless telephone network.

As mentioned above, portable communication device 10 may be used to connect to a wireless network. More particularly, as shown in FIG. 2, a user may, during normal operation, establish and maintain connection to a wireless network while working at a remote location, or while traveling in a vehicle as long as a wireless connection can be established. For example, the user may establish a wireless connection to a wireless wide area network via an IP protocol, or connect to one or more base stations 230 of a wireless telephone network by placing a telephone call, via the air interface. Subsequent to establishing the connection, the user may perform a variety of tasks such as transfer data or browse the Internet using a web browser, for example. In one embodiment, while the user is using the wireless connection, wireless module 70 may determine network characteristics associated with the wireless connection and provide those characteristics to processor 30 via a diagnostic port 72 or upon request via diagnostic query through the standard interface 57. For example, wireless module 70 may determine such characteristics as the connection speed and modulation, the signal strength, requested transmitter strength, the bit error rate of the wireless connection, date and time of day, along with the approximate geographic location of the portable communication device described by the tower number, quadrant and signal strength, for example. In addition, in various embodiments, portable communication device 10 may include an optional global positioning system (GPS) module 95. In such embodiments, the geographic location of the portable communication device may be determined more accurately. Wireless module 70 may provide the characteristic information to processor 30.

More particularly, connection speed may be associated with a rate of transfer of data via the wireless connection. An exemplary listing of modulation protocols is given above. The requested transmitter strength may correspond to the transmitter power that the base station or tower has requested the portable communication device 10 uses, and may be indicative of the tower reception of the signal from the portable device. The bit error rate may correspond to a bit error count detected by portable communication device 10, either correctable or uncorrectable.

Processor 30 may access a database, a routing table, or the like, that includes routing information associated with the wireless network to which a connection has been established. As such, the characteristic information data may be formatted by processor 30 by encapsulating the data in packets that include a routing header, for example. The routing information may include an address of one or more data storage facilities (e.g., storage facility 240 of FIG. 2) within which the network characteristic information may be stored. In some embodiments, the various wireless network operators may access the storage facilities to determine such network parameters as coverage quality and area issues, hotspots for congestion mapping, and the like.

Accordingly, processor 30 may provide the formatted (e.g., packetized) network characteristic information to wireless module 70 for transmission via the wireless connection. In various embodiments, the network characteristic information packets may be sent via one or more side channels specifically used for such data traffic, or the packets may be sent on the normal channels, thus preempting normal traffic at intervals specified by the network.

In addition, depending on the specific implementation, processor 30 may store the network characteristic information within storage 80 until a predetermined time has elapsed, or until the information is requested by an entity such as a network provider. For example, the network characteristic information may be gathered and stored for some predetermined period of time. When the time has elapsed, the stored network characteristic information may be formatted and transmitted to one or more data storage facilities as described above. Alternatively, the stored network characteristic information may be formatted and transmitted in response to an authorized request for the information.

Referring to FIG. 2, a diagram depicting embodiments of the portable communication system shown in FIG. 1 being used in wireless wide area network is shown. A user 220 is operating portable communication device 10A, and a user 222 is operating portable communication device 10B. As shown, portable communication device 10A is a laptop or notebook computer, and portable communication device 10B is a handheld communication device such as a mobile telephone, PDA, or the like. As described above, portable communication device 10 may connect to one or more base stations 230 of a wireless network via the air interface. The base station 230 may provide a connection to storage facility 240 by a wireless connection or a wire line connection. The storage facility 240 may in turn be accessed by computers 250 used by network operators and/or network providers via either a wireless connection or a wire line connection as desired. As such the network operators and network providers may determine such parameters as congestion maps, wireless coverage area maps, and quality of service, for example, based on the characteristic information stored in the storage facilities.

Figure 3:
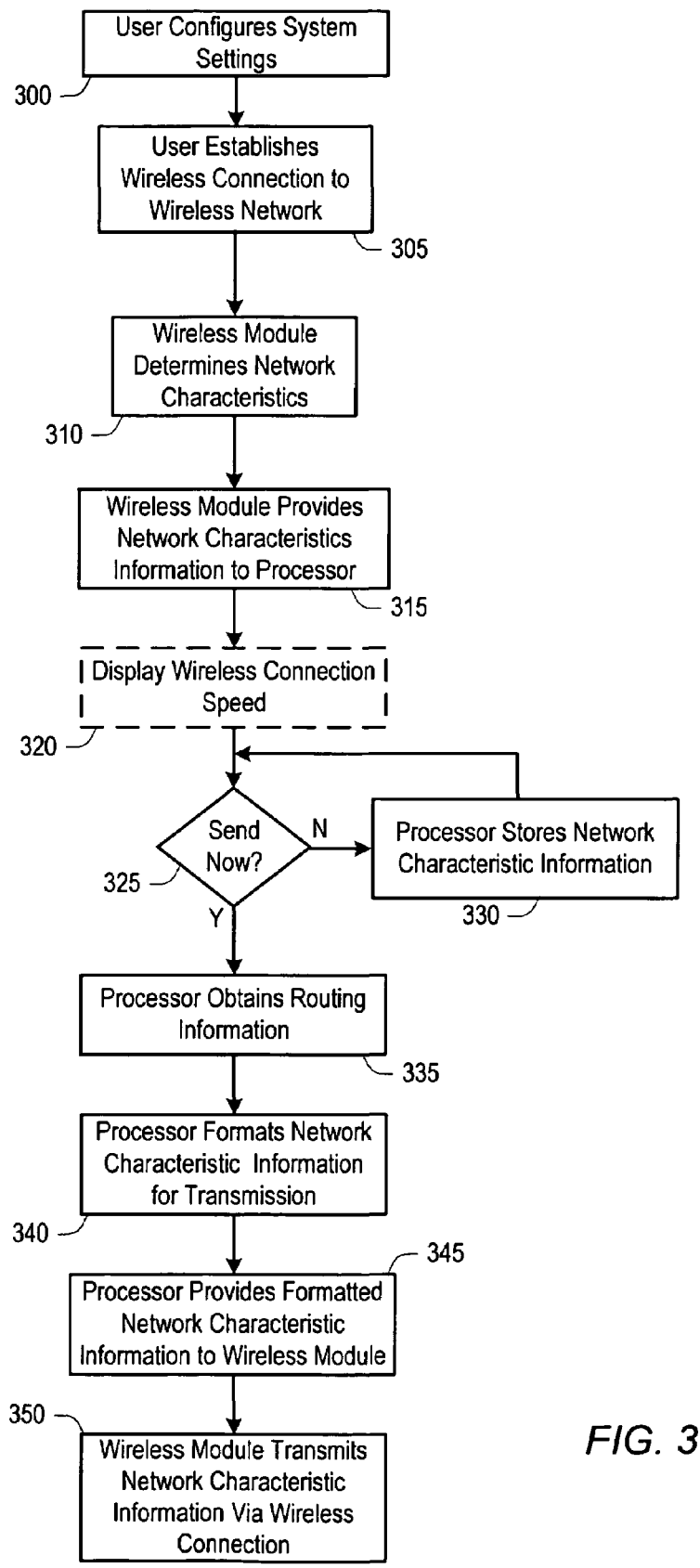
FIG. 3 is a flow diagram describing the operation of one embodiment of the portable communication device of FIG. 1.

FIG. 3 is a flow diagram describing the operation of the embodiment of the portable computer system shown in FIG. 1. Referring collectively to FIG. 1 through FIG. 3, beginning in block 300, a user (e.g., 220, 222) may configure operation of the wireless module 70 by selecting one or more drivers. For example, passwords and other authentication information may be entered and stored, low-power state operation may be selected, remote access (e.g., IP address) information may be entered, and so on.

Once the system settings have been configured, the user may establish a wireless connection to the Internet using an IP protocol, or by via dial-up by calling a telephone number to an ISP, for example (block 305). During normal operation by the user, wireless module 70 may determine network characteristics such as connection speed, signal strength, etc. as described above (block 310). Wireless module 70 may provide the characteristic information to processor 30 via a diagnostic port, for example (block 315).

In some embodiments, processor 30 may cause the wireless connection speed to be displayed on a display such as display 60 or display 65, for example (block 320). In addition, depending on implementation, processor 30 may determine whether to store the network characteristic information within storage 80 or to format the network characteristic information for transmission (block 325). Accordingly, as described above, if the network characteristic information is not to be transmitted now, processor 30 may store the network characteristic information to storage 80 (block 330) until a later time. However, if the network characteristic information is to be sent now (block 325), processor 30 may as it receives the network characteristic information, from wireless module 70, access a routing database to determine to which wireless operator the network characteristic information should be sent (block 335). Processor 30 may format the network characteristic information data by encapsulating the data into packets with the appropriate routing header information (block 340). Processor 30 may provide the data packets to wireless module 70 (block 345).

Wireless module 70 may transmit the data packets via the wireless connection (block 350). It is noted that depending on the specific implementation and the wireless network, wireless module 70 may transmit the data packets via the normal data channel, or it may transmit the data packets via a specific side channel that may be designated for such use.

Figure 4A:
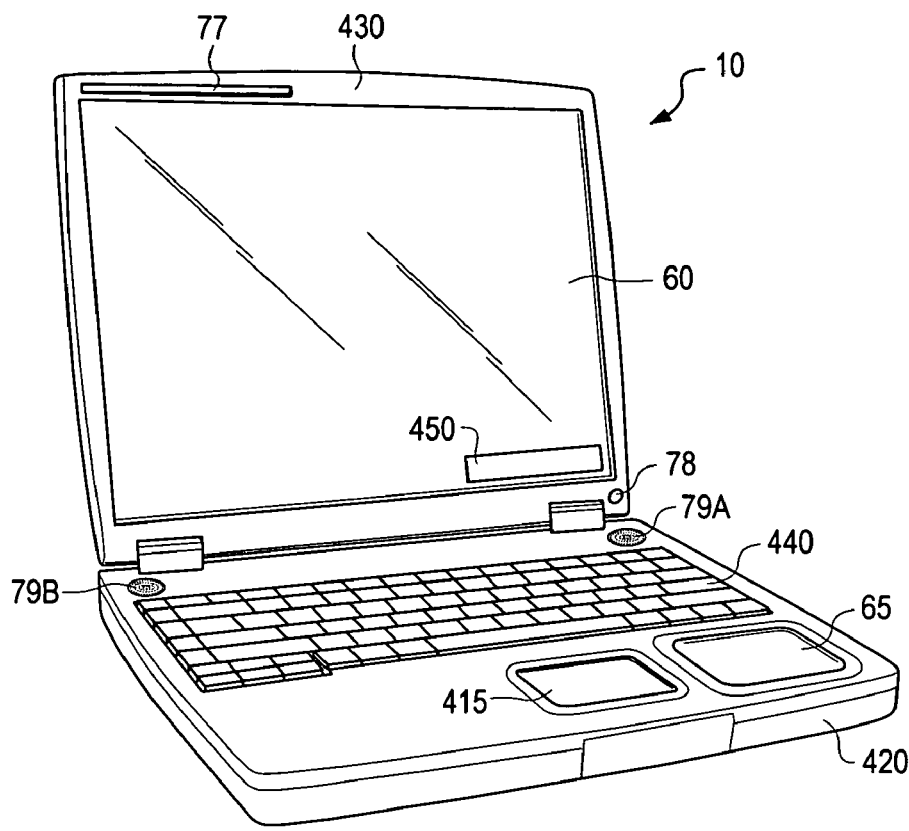
FIG. 4A is a perspective view drawing of one embodiment of the portable communication device of FIG. 1.
Figure 4B:
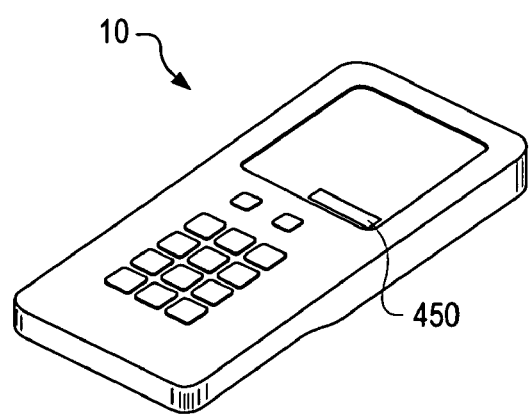
FIG. 4B is a perspective view drawing of another embodiment of the portable communication device of FIG. 1.

FIG. 4A and FIG. 4B are perspective view drawings of exemplary embodiments of the portable computer system including wireless functionality shown in FIG. 1. FIG. 4A depicts the portable communication device 10 as a laptop computer (i.e., a notebook computer) that includes a housing 420 with a hingably attached cover 430 that is in an open position. FIG. 4B depicts another embodiment of the portable communication device 10 as a handheld portable communication device.

Referring to FIG. 4A, the cover 430 includes a display 60 such as an LCD, microelectro-mechanical (MEMS), or electronic ink (Eink), for example, that forms a part of the internal surface of the cover. In addition, in the illustrated embodiment, portable communication device 10 includes an antenna 77 that is mounted to cover 430. It is noted that the mounting location, type, and numbers of antenna 77 are implementation details. Accordingly, although antenna 77 is shown mounted to the inside of cover 230, in other embodiments, antenna 77 may be mounted to cover 230 or housing 220, or even internal to housing 220 as desired. In addition, antenna 77 may go entirely or partially around display 60. As shown on display 60, a connection speed icon 450 may be present to indicate the wireless connection speed.

Portable communication device 10 also includes a microphone 78, speakers 79A and 79B, and a keyboard 440, and a touch activated mouse control 415 that are mounted on a top surface of the housing 420. In addition, portable communication device 10 includes an additional display unit (e.g., LR display 65) mounted to the top surface of housing 420. As described above, in one embodiment, display 65 may be a low-resolution display. In various other embodiments, LR display 65 may also be an input device (e.g., touch-activated screen) to facilitate use of a pointing device such as a stylus, for example. As such, LR display 65 may include analog-to-digital conversion circuits to input data from the screen. It is noted that the location and type of LR display 65 are also implementation details. As such, LR display 65 may be located in any desired location, another example of which is shown in FIG. 4B.

Referring to FIG. 4B, portable communication device 10 is shown as a handheld unit such as mobile telephone, or other handheld communication device.

Portable communication device 10 of FIG. 4B may also be representative of the system shown in FIG. 1. Although the specific embodiment shown in FIG. 4B does not include a second display 65, it is contemplated that in other embodiments, a second display be included. For example, mobile telephones that include a flip top may include a second display that may be mounted on the surface of the flip top, as desired. As shown on the display, a connection speed icon 450 may be present to indicate the wireless connection speed.

It is noted that although the above embodiments of portable communication device 10 may be used by communication network industry professionals during the course of their work, it is contemplated that the above embodiments may be implemented as consumer devices available to the general public. As such, there may be ubiquitous, statistically significant equipment deployment and data collection in actual usage patterns within a given network.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile communication device comprising:
a processor; and
a wireless module coupled to the processor and configured to communicate with a wireless network via a wireless connection;
wherein the wireless module is further configured to determine network characteristic information associated with the wireless connection and to provide the characteristic information to the processor, wherein the characteristic information comprises connection speed information associated with a rate of transfer of data via the wireless connection;

wherein the processor is configured to format the characteristic information using a predetermined routing header that identifies an address of a data storage facility that is accessible by the wireless network, for transmission via the wireless connection; and wherein the wireless module is configured to transmit the formatted characteristic information to the wireless network.

2. The communication device as recited in claim 1, wherein the processor is further configured to store the characteristic information within a storage prior to formatting and transmitting the formatted characteristic information.

3. The communication device as recited in claim 1, wherein the characteristic information comprises information corresponding to a bit error rate of the wireless connection.

4. The communication device as recited in claim 1, wherein the characteristic information comprises information corresponding to a geographic location of the communication device during determination of the characteristic information.

5. The communication device as recited in claim 1, wherein the characteristic information comprises information corresponding to a signal strength of a wireless network signal received by the communication device.

6. The communication device as recited in claim 1, wherein the characteristic information comprises information corresponding to a modulation protocol of the wireless connection.

7. The communication device as recited in claim 1, wherein the wireless module is configured to provide the characteristic information to the processor via a diagnostic port.

8. The communication device as recited in claim 1, wherein the wireless module is further configured to provide the characteristic information to the processor in response to a diagnostic query via a standard interface between the processor and the wireless module.

9. The communication device as recited in claim 1, wherein the wireless module is configured to determine the characteristic information concurrent with normal operation by a user.

10. The communication device as recited in claim 1, wherein the characteristic information comprises information corresponding to a transmit power requested by a component within the wireless network.

11. The communication device as recited in claim 1, wherein the characteristic information comprises information corresponding to current time of day, and current date.

12. A system comprising:
a wireless network including one or more base stations configured to communicate with one or more portable communication devices via one or more respective wireless connections;
a data storage facility;
wherein at least one of the one or more portable communication devices includes:
a processor; and
a wireless module coupled to the processor and configured to communicate with the wireless network via the respective wireless connection;
wherein the wireless module is further configured to determine characteristic information associated with the respective wireless connection and to provide the characteristic information to the processor, wherein the characteristic information comprises connection speed information associated with a rate of transfer of data via the wireless connection;
wherein the processor is configured to format the characteristic information using a predetermined routing header that identifies an address of the data storage facility for transmission via the wireless connection; and
wherein the wireless module is configured to transmit the formatted characteristic information to the wireless network;
wherein the data storage facility is configured to store the characteristic information.

13. The system as recited in claim 12, wherein the processor is further configured to store the characteristic information within a storage of the portable communication device prior to formatting and transmitting the formatted characteristic information.

14. The system as recited in claim 12, wherein the characteristic information comprises information corresponding to a bit error rate of the wireless connection.

15. The system as recited in claim 12, wherein the characteristic information comprises information coffesponding to a geographic location of the communication device during determination of the characteristic information.

16. The system as recited in claim 12, wherein the characteristic information comprises information corresponding to a signal strength of a wireless network signal received by the communication device.

17. The system as recited in claim 12, wherein the characteristic information comprises information corresponding to a modulation protocol of the wireless connection.

18. The system as recited in claim 12, wherein the wireless module is configured to provide the information to the processor via a diagnostic port.

19. The system as recited in claim 12, wherein the wireless module is further configured to provide the characteristic information to the processor in response to a diagnostic query via a standard interface between the processor and the wireless module.

20. The system as recited in claim 12, wherein the wireless module is configured to determine the characteristic information concurrent with normal operation by a user.

21. The system as recited in claim 12, wherein the characteristic information comprises information corresponding to a transmit power requested by a component within the wireless network.

22. The system as recited in claim 12, further comprising a wireless network provider computer configured to access the characteristic information stored within the data storage facility and to generate congestion maps based upon the characteristic information.

23. The system as recited in claim 22, the wireless network provider computer is further configured to access the characteristic information stored with the data storage facility and to determine wireless network coverage area based upon the characteristic information.

24. The system as recited in claim 21, wherein the characteristic information comprises information corresponding to current time of day, and current date.

25. A method comprising:
a wireless module of a portable communication device communicating with a wireless network via a wireless connection;
the wireless module determining characteristic information associated with the wireless connection, wherein the characteristic information comprises connection speed information associated with a rate of transfer of data via the wireless connection;
the wireless module providing the characteristic information to a processor;

the processor formatting the characteristic information using a predetermined routing header that identifies an address of the data storage facility for transmission via the wireless connection; and the wireless module transmitting the formatted characteristic information to the wireless network.

* * * * *

UNITED STATES PATENT AND TRADEMARK OFFICE
CERTIFICATE OF CORRECTION

PATENT NO. : 7,733,221 B2 Page 1 of 1
APPLICATION NO. : 11/478695
DATED : June 8, 2010
INVENTOR(S) : Robert Ober It is certified that error appears in the above-identified patent and that said Letters Patent is hereby corrected as shown below:

Claim 15, col. 10, line 18, please change "coffesponding" to "corresponding".

Signed and Sealed this

Tenth Day of August, 2010

David J. Kappos
*Director of the United States Patent and Trademark Office*